No. 712,889. Patented Nov. 4, 1902.
J. A. YEAROUT.
INSECT DESTROYER.
(Application filed Feb. 11, 1902.)
(No Model.)
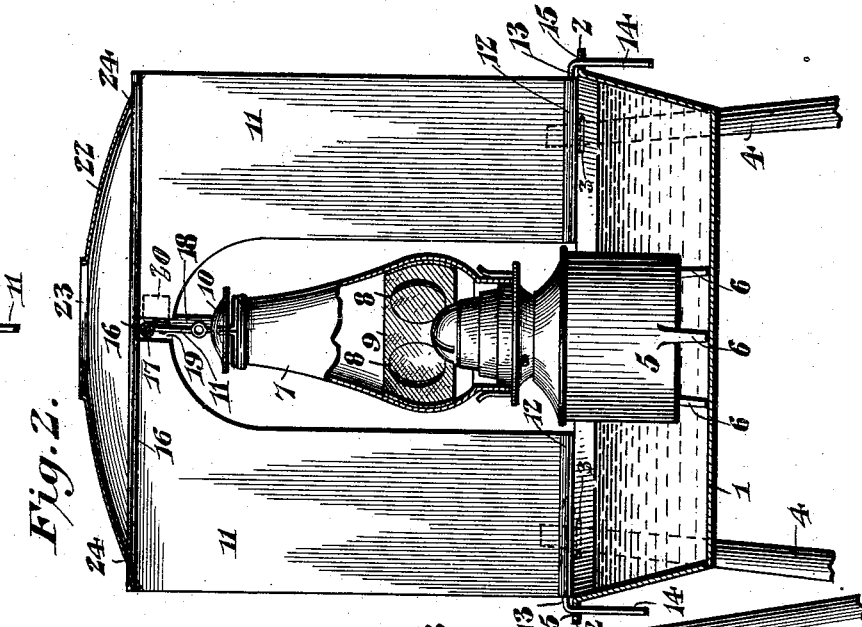
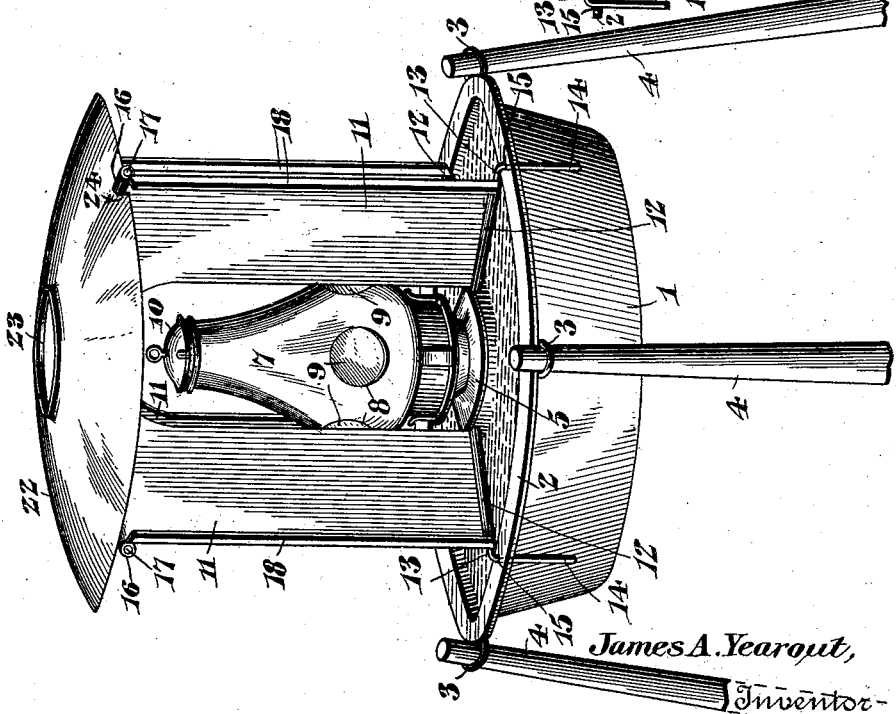
James A. Yearout,
Inventor
Witnesses
By
Attorney

UNITED STATES PATENT OFFICE.

JAMES A. YEAROUT, OF LYNDON, KANSAS, ASSIGNOR OF ONE-HALF TO FRANK D. MILES, OF LYNDON, KANSAS.

INSECT-DESTROYER.

SPECIFICATION forming part of Letters Patent No. 712,889, dated November 4, 1902.

Application filed February 11, 1902. Serial No. 93,576. (No model.)

*To all whom it may concern:*

Be it known that I, JAMES A. YEAROUT, a citizen of the United States, residing at Lyndon, in the county of Osage and State of Kansas, have invented a new and useful Insect-Destroyer, of which the following is a specification.

This invention relates to insect-destroyers, and has for its object to provide an improved device of this character which is adapted to be set up out of doors and embodies a light to attract the insects and is also provided with means to obstruct the flight of the insects and to deflect the same into a liquid-bath, so as to trap the insects and also kill the same.

It is furthermore designed to have the parts of the device arranged so as to be conveniently set up and also readily removed for convenience in cleansing the same and in storing the device when not required for use.

Another object is to have the lamp which produces the attracting-light supported in a stable manner and also protected by the means for obstructing the flight of the insects, so as to avoid accidental upsetting of the lamp by the wind or otherwise, and at the same time to have said obstructing means located so as not to shut off the light.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective of an insect-destroyer constructed and arranged in accordance with the present invention. Fig. 2 is a longitudinal sectional view thereof. Fig. 3 is a detail plan section to illustrate the detachable connection between a pair of crossed deflecting members.

Like characters of reference designate corresponding parts in all the figures of the drawings.

In carrying out the present invention there is provided a receptacle 1, preferably in the form of a comparatively shallow metallic pan having an outwardly-directed flat marginal rim or flange 2, which carries a plurality of outwardly-directed rings 3, which are adapted to receive the upper tapered ends of suitable standards or props 4, whereby the device may be supported at any desired place. The pan is designed to contain a suitable liquid-bath which is injurious to insects, and at the center of the pan is placed a lamp 5, having suitable legs 6. This lamp is provided with a metallic chimney 7, having a plurality of openings 8, which are covered by suitable transparent material (preferably isinglass) 9, so that the light may shine therethrough, and thereby attract the insects to the device. The top of the chimney is provided with a cap 10, which is spaced slightly above the chimney, so as to permit of the required draft and at the same time to prevent sudden drafts of wind from blowing out the light, said top being substantially the same as is now commonly provided upon ordinary lantern-chimneys. A plurality of deflectors 11, preferably two in number, straddle the lamp-chimney and are supported upon the upper edge of the pan or receptacle. Each deflector consists of a substantially rectangular sheet of metal, which is bifurcated to produce an inverted substantially U-shaped plate, the opposite sections of which are spaced at a distance to easily straddle the lamp-chimney without interfering with the same and at the same time to provide supports to prevent upsetting of the lamp. The lower edge of each section of the plate is provided with a bead 12, snugly embracing the stiffening-wire 13, which has its outer end bent downwardly to form an attaching stem or pin 14, which is removably thrust downwardly through an opening 15 in the rim of the pan, so as to detachably connect the lower portion of the plate with the pan. The top edge of each plate is beaded, as at 16, and provided with a stiffening-wire 17. The outer upstanding edges of each plate are provided with integral laterally-projected flanges 18, which stiffen the plates and also tend to prevent the insects from escaping from the deflectors, as will be hereinafter explained. The deflector members are preferably arranged at substantially right angles to each other, and one of these members is provided centrally in its upper portion with a vertical slot or bifurcation 19 to receive the upper edge of the other member, said other member being provided with a pair of lateral projections or ears 20, as best indicated in Fig. 3 of the drawings, to embrace the upper portion of the first-mentioned member, and thereby interlock the two members against lateral separation. It will thus be understood that each member is individually connected to the pan or receptacle and they are mutually interlocked at their point of intersection, whereby they brace each other and form an efficient guard to prevent accidental upsetting of the lamp. The projections 20 are preferably formed by angleplates, which are connected to the adjacent deflector-plate by means of rivets 21 or other suitable fastenings.

Over the top of the device there is provided a convex top or cover 22, preferably formed of sheet metal and provided with a central opening 23 and diametrically oppositely disposed notches 24, formed in the outer edge of the top and designed to receive the outer end portions of the top edge of that deflector member which straddles the other, so as to prevent lateral displacement of the top or cover and to form an additional brace for the deflectors.

When the device has been set up, as illustrated in the drawings, and the lamp lighted, the insects will be attracted by the light and will fly against the deflector-plates, and thereby be deflected into the liquid-bath in the pan. The upstanding flanges 18 at the outer edges of the deflectors serve to arrest those insects which may be deflected outwardly instead of downwardly, and thereby prevent escape of such insects.

An important advantage of the present device resides in the fact that the lower end portions of the bifurcations of the deflector-plates are of a width to straddle and receive the body of the lamp, whereby said plates may be placed downwardly astraddle of the lamp and also removed therefrom in the opposite direction without in any manner disturbing the lamp, thereby facilitating the application and removal of the plates in setting up and taking down the device and also in cleansing the same. By this construction of parts the lamp is supported at the lowermost portion of the device and independent of the deflectors, whereby the latter may be applied and removed without interfering with the lamp, and the latter does not render the device topheavy.

From the foregoing description it is apparent that all the parts of the improved device may be conveniently set up and also detached, whereby such parts may be conveniently cleansed and the entire device collapsed into a comparatively small space for storage when not desired for use.

It will be noted that the inner edges of each deflector are not connected in order that the lamp may be supported upon the bottom of the pan or receptacle, which is the lowest point of the device, whereby the lamp may be in a stable condition and not liable to be upset. Furthermore, by providing the notches 24 in the lid or cover the outer edge portion of the latter projects downwardly below the upper ends of the flanges 18, whereby the latter form stops to prevent lateral displacement of the lid or cover.

What I claim is—

1. An insect-destroyer, comprising an open-topped receptacle, a lamp supported upon the bottom of the receptacle, and a vertical deflector-plate detachably supported upon the receptacle and provided with a vertical bifurcation intersecting the lower edge thereof with the lamp received within the bifurcation, the lower portion of the bifurcation being of a width to straddle the lamp and thereby permit the latter to be supported upon the bottom of the receptacle.

2. In an insect-destroyer, the combination of an open-topped pan, a lamp supported centrally upon the bottom of the pan, a pair of vertical radially-disposed deflector-plates detachably supported upon the rim of the pan, each plate having a bifurcation intersecting its lower edge and receiving the lamp, the lower end of the bifurcation being of a width to straddle the body of the lamp, one of the plates straddling the other across the top of the lamp and having the back edge of its bifurcation provided with a notch receiving the upper edge of the other plate, and a cover supported upon the tops of the plates and provided with edge notches receiving some of the top edges of the plates.

3. An insect-destroyer, comprising a receptacle to contain an insect-destroying agent, a lamp located within and supported upon the bottom of the receptacle, and radially-disposed deflectors grouped about the lamp and provided at their outer edges with upstanding laterally-projected flanges.

4. An insect-destroyer, comprising a receptacle to contain an insect-destroying agent, a lamp, a plurality of deflectors straddling the lamp and removably supported upon the receptacle, and a top or cover removably supported upon the top edges of the deflectors and provided with marginal notches to receive some of said edges, the deflectors which are received in the notches of the cover being provided at their outer edges with flanges forming stops to prevent lateral displacement of the cover.

5. In an insect-destroyer, the combination with a pan having an outwardly-directed marginal rim at its upper edge, said rim being provided with sets of diametrically opposite perforations, and outwardly-directed rings carried by the rim, of a plurality of props or supports having their upper ends received in the rings or eyes, a lamp supported within and upon the bottom of the pan, a plurality of inverted substantially U-shaped deflectors straddling the lamp and supported upon the rim of the receptacle, the opposite edges of each deflector having pendent pins removably inserted through corresponding perforations in the rim, upstanding laterally-projected flanges carried by the outer edges of the deflectors, one of the latter having a central notch to receive the upper edge of the other deflector, said other deflector having a pair of lateral projections embracing a portion of the first-mentioned deflector, and a top or cover supported upon the tops of the deflectors and provided with diametrically opposite marginal notches receiving the adjacent upper edges of the deflectors.

6. An insect-destroyer, comprising a receptacle to contain an insect-destroying agent, a lamp, deflectors straddling the lamp and provided with lateral flanges at their outer edges, and a top or cover supported upon the tops of the deflectors and provided in its outer edge with notches to receive some of said edges, the flanges which are adjacent to the notches forming stops to prevent lateral displacement of the top.

In testimony that I claim the foregoing as my own I have hereto affixed my signature in the presence of witnesses.

JAMES A. YEAROUT.

Witnesses:
T. H. ELLIS,
INA FAIRBANKS,
A. B. CRUM.